United States Patent
Worm et al.

(10) Patent No.: US 12,213,230 B2
(45) Date of Patent: Jan. 28, 2025

(54) DISABLE CONTROL OF A LIGHTING DEVICE BY A LIGHT CONTROL DEVICE IN A QUERY MODE

(71) Applicant: SIGNIFY HOLDING B.V., Eindhoven (NL)

(72) Inventors: Kevin Thomas Worm, Eindhoven (NL); Dzmitry Viktorovich Aliakseyeu, Eindhoven (NL); Sonia Kataria, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 379 days.

(21) Appl. No.: 17/790,563

(22) PCT Filed: Dec. 15, 2020

(86) PCT No.: PCT/EP2020/086308
§ 371 (c)(1),
(2) Date: Jul. 1, 2022

(87) PCT Pub. No.: WO2021/139975
PCT Pub. Date: Jul. 15, 2021

(65) Prior Publication Data
US 2023/0092759 A1 Mar. 23, 2023

(30) Foreign Application Priority Data
Jan. 6, 2020 (EP) .................................... 20150318

(51) Int. Cl.
*H05B 47/16* (2020.01)

(52) U.S. Cl.
CPC .................................... *H05B 47/16* (2020.01)

(58) Field of Classification Search
USPC ............................................................. 700/83
See application file for complete search history.

(56) References Cited

U.S. PATENT DOCUMENTS 9,854,653 B1 * 12/2017 Ackmann ............ H05B 47/115
10,448,484 B1 * 10/2019 Rodriguez ............. H05B 47/20
(Continued)

FOREIGN PATENT DOCUMENTS

| EP | 1229432 A2 | 8/2002 |
| WO | 2018007450 A1 | 1/2018 |

*Primary Examiner* — Mohammad Ali
*Assistant Examiner* — Joshua T Sanders (57) ABSTRACT

A system (1) for controlling a lighting system (11) is configured to receive user input representing a request to activate a query mode and transmit a command to the lighting system. The command instructs the lighting system to temporarily disable control of a lighting device (31-35) by a light control device (21-23). The system is further configured to receive control information from the lighting system. The control information describes a user interaction with the light control device and/or describes a function corresponding to the user interaction. The system is also configured to render audio and/or visual information describing the function corresponding to the user interaction to the user, e.g. on a display (9), and transmit a further command to the lighting system. The further command instructs the lighting system to enable control of the lighting device by the light control device.

15 Claims, 4 Drawing Sheets

(56) References Cited

U.S. PATENT DOCUMENTS

| | | | |
|---|---|---|---|
| 2015/0159900 A1* | 6/2015 | Quam | H05K 7/12 |
| | | | 700/276 |
| 2015/0373796 A1* | 12/2015 | Bahrehmand | H05B 45/325 |
| | | | 315/129 |
| 2016/0062324 A1* | 3/2016 | Dyal | H05B 47/175 |
| | | | 700/275 |
| 2019/0141823 A1* | 5/2019 | Mason | H05B 47/115 |

* cited by examiner

DISABLE CONTROL OF A LIGHTING DEVICE BY A LIGHT CONTROL DEVICE IN A QUERY MODE

CROSS-REFERENCE TO PRIOR APPLICATIONS

This application is the U.S. National Phase application under 35 U.S.C. § 371 of International Application No. PCT/EP2020/086308, filed on Dec. 15, 2020, which claims the benefit of European Patent Application No. 20150318.2, filed on Jan. 6, 2020. These applications are hereby incorporated by reference herein.

FIELD OF THE INVENTION

The invention relates to a system for controlling a lighting system, said lighting system comprising a light control device and a lighting device, said light control device being used for controlling said lighting device.

The invention further relates to a method of controlling a lighting system, said lighting system comprising a light control device and a lighting device, said light control device being used for controlling said lighting device.

The invention also relates to a computer program product enabling a computer system to perform such a method.

BACKGROUND OF THE INVENTION

With the increasing popularity of connected lighting, more and more people will own multiple light control devices and many light control devices will have multiple physical controls. Each light control device is typically programmed by its owner. In the Philips Hue system, each button is assigned to a room and multiple functions can be programmed for a button, e.g. scene cycling, light source on-off, and dimming, and a user can have multiple of these buttons with different behaviors. WO 2018/007450A1 discloses an example of a programmable light control device.

WO 2018/007450A1 discloses a method of programming a respective rule for controlling lighting in each of one or more zones each being occupiable by a user. The rule specifies how the illumination emitted by an illumination source is to be controlled as a function of a user interaction. After actuating an actuator in a certain zone, the user can select one or more illumination sources arranged to illuminate this zone, which is then programmed into a memory as a rule.

On traditional remote controls, icons are often used for identifying the functionality of each button, but this requires dedicated buttons or labels for each function, which is not practical for programmable buttons. Furthermore, it is possible to associate different functions with a single button and select one of the functions depending on the way the button is pressed. For example, a button may be programmed to toggle a light source on/off on a single press, to dim on hold and to scene cycle on a double press.

The complexity of having multiple buttons with different functions may result in the user getting confused and using the wrong button or using the right button in the wrong way, e.g. double press the living room button to scene cycle, because that functionality is programmed in the kitchen button, whereas the living room button is programmed to dim on double press.

SUMMARY OF THE INVENTION

It is a first object of the invention to provide a system, which helps a user use a light control device.

It is a second object of the invention to provide a method, which helps a user use a light control device.

In a first aspect of the invention, a system for controlling a lighting system, said lighting system comprising a light control device and a lighting device, said light control device being used for controlling said lighting device, comprises at least one input interface, at least one output interface, and at least one processor configured to receive, via said at least one input interface, user input representing a request to activate a query mode, transmit, via said at least one output interface, a command to said lighting system, said command instructing said lighting system to temporarily disable control of said lighting device by said light control device, receive, via said at least one input interface, control information from said lighting system, said control information describing a user interaction with said light control device and/or describing a function corresponding to said user interaction, render, via said at least one output interface, audio and/or visual information describing said function corresponding to said user interaction to said user, and transmit, via said at least one output interface, a further command to said lighting system, said further command instructing said lighting system to enable control of said lighting device by said light control device.

This system helps a user understand the functions of his light control devices by allowing him to activate a query mode in which he can use a physical control of a light control device to get information on this physical control, without controlling the lighting device(s) associated with this physical control. Said at least one processor may be configured to render, via a display and/or a speaker of a mobile device and/or a voice assistant, said audio and/or visual information describing said function. The voice assistant may be accessed on the mobile device or on a smart speaker like the Amazon Echo, for example.

As a first example, the user may indicate to the system his intention to enquire about the functionality of a button of a specific light control device. The system temporarily disables all physical controls of that specific light control device with respect to controlling associated lighting devices and renders information describing this functionality after the user interacts with that specific light control device, e.g. presses a button of that specific light control device.

As a second example, a user may not know which light control device he is looking at and may indicate that he would like to enquire about the functionality of an unknown button. The system temporarily disables all physical controls of all light control devices within a defined scope (e.g. all devices in a room or home) with respect to controlling associated lighting devices, but other light control devices can still be used to control associated lighting devices. After the system detects user interaction with a light control device, it assumes that this is the light control device the user wants to enquire about.

Said command and said further command may be transmitted to said light control device and said control information may be received from said light control device. This allows the system to work without a (light) bridge. An alternative is to transmit the command and further command to a bridge and to receive the control information from the bridge. This alternative allows the light control device to be simpler. For example, the light control device only needs to transmit control information describing a user interaction with the light control device to the bridge without knowing what function is associated with this user interaction. In this case, it is the bridge that translates the control information transmitted by the light control device into a command for one or more lighting devices and the bridge may either forward this control information to the system or transmit control information that describes the function to the system, for example.

Said control information may comprise an identifier of said light control device and describe a user interaction with said light control device and said at least one processor may be configured to determine a description of said function from said identifier and said description of said user interaction. This beneficial if the control information does not comprise the description of the function.

Said control information may describe a user interaction with a button or rotary switch of said light control device and/or a function corresponding to said user interaction with said button or rotary switch of said light control device. Buttons and rotary switches are often used on light control devices.

Said lighting system may comprise a plurality of light control devices and said at least one processor may be configured to determine a subset of said plurality of light control devices, said subset of light control devices comprising said light control device and being used to control a set of lighting devices, said set of lighting devices comprising said lighting device, transmit, via said at least one output interface, one or more commands to said lighting system, said one or more commands instructing said lighting system to temporarily disable control of said set of lighting devices by said subset of light control devices, and transmit, via said at least one output interface, one or more further commands to said lighting system, said one or more further commands instructing said lighting system to enable control of said set of lighting devices by said subset of light control devices. By disabling control by only a (strict) subset of the light control devices, other light control devices can still be used in the query mode, e.g. by other persons.

Said at least one processor may be configured to determine said subset of said plurality of light control devices based on said user input. For example, the user may be able to select the subset from a list of commissioned light control devices, e.g. in an app.

Said at least one processor may be configured to determine a location of said user and determine said subset of said plurality of light control devices based on said location. This is beneficial if the user does not know which light control device he is looking at. Typically, a user will want information on the light control device(s) closest to him. If the location of the user is known, this may also be used to select on which device to render the audio and/or visual information describing the function corresponding to the user interaction. For example, if a smart speaker, e.g. an Amazon Echo speaker, is in the same room as the user, the audio and/or visual information may be rendered on this smart speaker. If not, the audio and/or visual information may be rendered on the user's mobile phone, for example. Alternatively, the closest device able to render audio and/or visual information describing the function corresponding to the user interaction may be selected, for example.

Said at least one processor may be configured to start a timer upon receiving said user input and transmit, via said at least one output interface, said further command upon expiry of said timer. This allows the query mode to be ended automatically, without requiring user interaction.

Said at least one processor may be configured to receive, via said at least one input interface, further user input representing a request to deactivate said query mode and transmit, via said at least one output interface, said further command upon receiving said further user input. This allows the user to end the query mode earlier, without having to wait for the query mode to end automatically, or this may be used instead of an automatically ending query mode.

Said at least one processor may be configured to control, via said at least one output interface, a further lighting device of said one or more lighting devices based on said received control information. This may be used to enhance the rendering of the description of the function by demonstrating a light scene associated with an interaction/physical control on a subset (e.g. one) of the lighting devices associated with the light scene or on a different lighting device.

Said at least one processor may be configured to display, via said at least one output interface, an animation demonstrating said function. For example, said at least one processor may be configured to display, via said at least one output interface, a virtual room comprising a virtual representation of said at least one lighting device and said animation superimposed over said virtual room. This enhances the rendering of the description of the function.

In a second aspect of the invention, a method of controlling a lighting system, said lighting system comprising a light control device and a lighting device, said light control device being used for controlling said lighting device, comprises receiving user input representing a request to activate a query mode, transmitting a command to said lighting system, said command instructing said lighting system to temporarily disable control of said at least one lighting device by said light control device, receiving control information from said lighting system, said control information describing a user interaction with said light control device and/or describing a function corresponding to said user interaction, rendering audio and/or visual information describing said function corresponding to said user interaction to said user, and transmitting a further command to said lighting system, said further command instructing said lighting system to enable control of said lighting device by said light control device. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a lighting system, said lighting system comprising a light control device and a lighting device, said light control device being used for controlling said lighting device.

The executable operations comprise receiving user input representing a request to activate a query mode, transmitting a command to said lighting system, said command instructing said lighting system to temporarily disable control of said at least one lighting device by said light control device, receiving control information from said lighting system, said control information describing a user interaction with said light control device and/or describing a function corresponding to said user interaction, rendering audio and/or visual information describing said function corresponding to said user interaction to said user, and transmitting a further command to said lighting system, said further command instructing said lighting system to enable control of said lighting device by said light control device.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
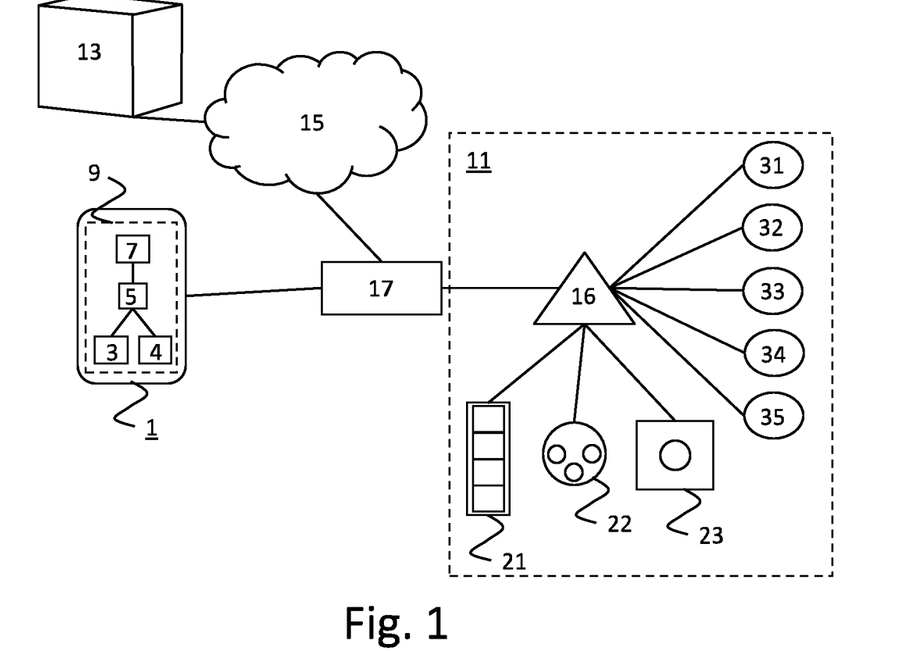
FIG. 1 is a block diagram of an embodiment of the system.

FIG. 1 shows an embodiment of the system for controlling a lighting system: a mobile device 1. The lighting system 11 comprises light control devices 21-23, lighting devices 31-35 and a (light) bridge 16. The lighting devices may be Philips Hue lighting devices and the light control devices may be Philips Hue control devices, for example. The light control device 21 may be a Philips Hue dimmer switch, for example. The light control device 22 may be a Philips Hue tap switch, for example. The light control device 23 may be a Philips Hue smart button, for example.

The lighting devices 31-35 and light control devices 21-23 communicate with the bridge 16, e.g. using Zigbee technology. The bridge 16 may be a Philips Hue bridge, for example. The light control devices 21-23 are used for controlling the lighting devices 31-35 via the bridge 16. The mobile device 1 is also able to control the lighting devices 31-35, via a wireless LAN access point 17 and the bridge 16. The wireless LAN access point 17 is connected to the Internet 15. An Internet server 13 is also connected to the Internet 15.

The mobile device 1 comprises a transceiver 3, a transmitter 4, a processor 5, memory 7, and a touchscreen display 9. The processor 5 is configured to receive, via the touchscreen display 9, user input representing a request to activate a query mode, and transmit, via the transmitter 4, a command to the lighting system 11. The command instructs the lighting system 11 to temporarily disable control of the lighting devices 31-35 by the light control devices 21-23 (or a subset thereof). In the embodiment of FIG. 1, this command is transmitted to the bridge 16. In an alternative embodiment, a command is transmitted to each of the (subset of) light control devices 21-23.

The processor 5 is also configured to receive from the lighting system 11, via the receiver 3, control information that describes a user interaction with a light control device and/or describes a function corresponding to the user interaction, and render, via the at touchscreen display 9, visual information describing the function corresponding to the user interaction to the user. In the embodiment of FIG. 1, the control information is received from the bridge 16.

In an alternative embodiment, the control information is received directly from the light control device. If the control information does not comprise a description of the function corresponding to the user interaction, the control information may instead comprise an identifier of the light control device and describe a user interaction with the light control device. The mobile device 1 may then, for example, be able to transmit this information to the server 13 and obtain the description of the function corresponding to the user interaction from the server 13.

In the embodiment of FIG. 1, visual information is rendered. In an alternative embodiment, a voice assistant receives the user input from the user via speech and this voice assistant renders audio information describing the function corresponding to the user interaction to the user. This voice assistant may run on the mobile device 1 and use a speaker (not shown) of the mobile phone 1 or other audio output (not shown) of the mobile phone 1 or may run on a smart speaker (not shown), for example.

The processor 5 is also configured to transmit, via the transmitter 4, a further command to the lighting system 11. The further command instructs the lighting system 11 to enable control of the lighting devices 31-35 by the light control devices 21-23. In the embodiment of FIG. 1, this command is transmitted to the bridge 16. In an alternative embodiment, a command is transmitted to each of the (subset of) light control devices 21-23.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The touchscreen display 9 may comprise an LCD or OLED display panel, for example. The processor 5 may use this touch screen to provide a user interface, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the system of the invention is a mobile device. In an alternative embodiment, the system of the invention is a different device, e.g. a smart speaker. In the embodiments of FIG. 1, the system of the invention comprises a single device. In an alternative embodiment, the system of the invention comprises a plurality of devices. In the embodiment of FIG. 1, the lighting system 11 comprises a bridge. In an alternative embodiment, the light control devices 21-23, the mobile device 1 and the lighting devices 31-35 communicate without a bridge, e.g. via Bluetooth.

Figure 2:
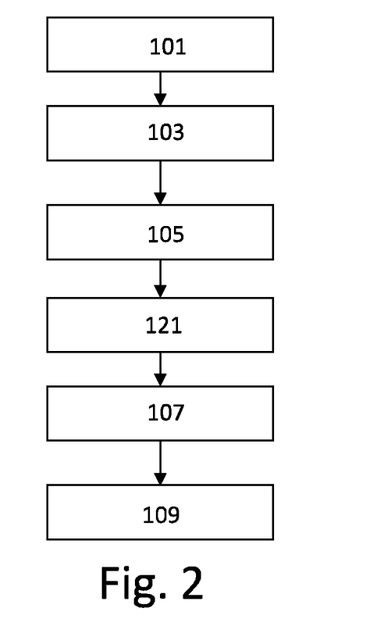
FIG. 2 is a flow diagram of a first embodiment of the method.

A first embodiment of the method of controlling a lighting system is shown in FIG. 2. The lighting system comprises a light control device and a lighting device. The light control device is used for controlling the lighting device. A step 101 comprises receiving user input representing a request to activate a query mode. The user may be able to explicitly make the request, for example by giving a voice command to a voice assistant "Alexa, what functions are assigned to this hue control". Alternatively, the same command may be given via a graphical user interface e.g. in an app on a mobile device. In another embodiment, a dedicated physical control is used, e.g. one of the buttons or interactions (e.g. 5 second press and hold) may be assigned to trigger the query mode. This dedicated physical control may be part of the light control device of which the user wants to learn the functionality of a certain physical control. For example, the user may know which button of the light control device triggers the query mode, but not the functionality assigned to at least one of the other physical controls.

A step 103 comprises transmitting a command to the lighting system. The command instructs the lighting system to temporarily disable control of the at least one lighting device by the light control device.

A step 105 comprises receiving control information from the lighting system. In the embodiment of FIG. 2, the control information comprises an identifier of the light control device and describes a user interaction with the light control device, e.g. user interaction with a button or rotary switch. A step 121 comprises determining a description of a function corresponding to the user interaction from the identifier of the light control device and the description of the user interaction.

The description of the interaction may describe that a button is pressed (or more specifically pressed once, twice or held) or that a rotary knob is rotated a certain amount, for example. The function may be switching light source on/off, diming up and/or down, scene recalling or scene cycling, for example. In an alternative embodiment, the control information already describes the function corresponding to the user interaction.

A step 107 comprises rendering audio and/or visual information describing the function corresponding to the user interaction to the user. After control by the light control device is disabled, the user can try different functions assigned to the light control device and instead of impacting the state of the lighting system, the user will be informed what every interaction is doing. Depending on the modality, information may be spoken, e.g. after clicking once—"Single click toggles the light on and off in the living room", or displayed on the screen of a mobile device or on any other screen that might be nearby the user and connected to the system.

A step 109 comprises transmitting a further command to the lighting system. The further command instructs the lighting system to enable control of the lighting device by the light control device. After the user has received the desired information, control needs to be re-enabled. Enabling can be triggered in the similar way as the request, i.e. the user can explicitly indicate to the system that the control need to go back to the normal operation mode. Alternatively, a timeout may be used, e.g. the light control device may get re-enabled five minutes after being disabled, or a minute after the user stopped requesting information (i.e. after using a disabled light control device).

Figure 3:
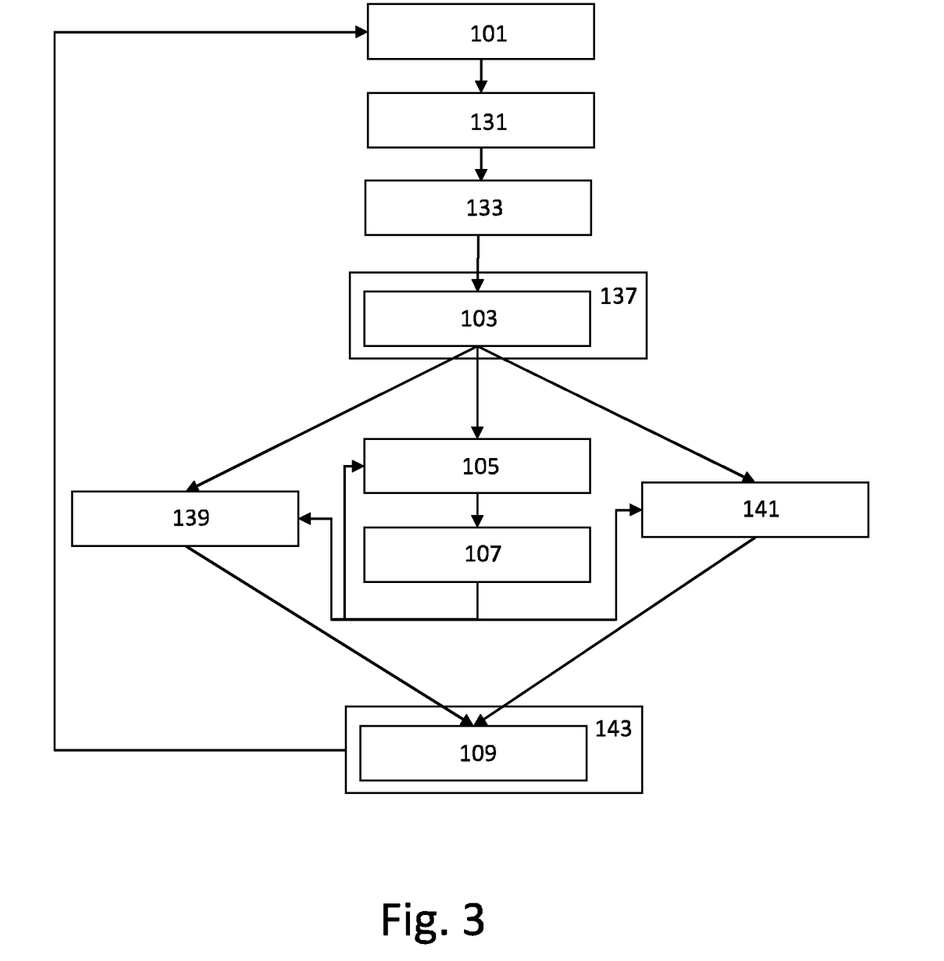
FIG. 3 is a flow diagram of a third embodiment of the method.

A second embodiment of the method of controlling a lighting system is shown in FIG. 3. In this second embodiment, the lighting system comprises a plurality of light control devices. Step 101 comprises receiving user input representing a request to activate a query mode. The user may indicate specific properties or an identification of one or more light control devices in the request such that only a subset of light control devices would need to be disabled. For example, saying to the system. "Alexa, what functions are assigned to this red button", might give enough information to the system to identify what button the user is talking about. In the case of using a smartphone app, the user might for example be able to select a specific control in the app or indicate a type of the light control device e.g. buttons versus dimmer switches.

A step 131 comprises starting a timer upon receiving the user input. For example, a system might implement a timeout where if no action is detected within 30 seconds all controls are enabled again and system returns to its normal operation. The timer may alternatively be started a bit later.

For example, in an alternative embodiment, step 131 is performed between step 137 and step 105. A step 133 comprises determining a (strict) subset of the plurality of light control devices. The subset of light control devices consists of less light control devices than the plurality of light control devices. The subset of light control devices is used to control a set of lighting devices.

In the embodiment of FIG. 3, the subset is identified based on the user input received in step 101. In an alternative embodiment, the subset is identified based on any contextual information that the system can gather at that moment, e.g. a location of the user, list of light control device(s) assigned to this location and/or the light control device location(s). Preferably, only one light control device is disabled.

A step 137 comprises transmitting one or more commands to the lighting system. The one or more commands instruct the lighting system to temporarily disable control of the set of lighting devices by the subset of light control devices. Step 137 may comprise transmitting a single command if the command is transmitted to a bridge of the lighting system and multiple commands if the command is transmitted to lighting devices of the lighting system, for example. In the embodiment of FIG. 3, step 103 of FIG. 2 is part of step 137, as the subset of light control device may comprise multiple light control devices.

After the light control devices are disabled, the first event coming from one of the disabled light control devices triggers information rendering. All other light control devices may be enabled at that moment. A step 105, 139 or 141 is performed after step 137, whichever event takes place first.

Step 105 comprises receiving control information from the lighting system. In the embodiment of FIG. 3, the control information describes the function corresponding to the user interaction, e.g. user interaction with a button or rotary switch. Step 107 comprises rendering audio and/or visual information describing the function corresponding to the user interaction to the user, based on the control information received in step 105. Step 105 is repeated after step 107 or step 139 or 141 are performed after step 107, whichever event takes place first.

Step 139 comprises receiving further user input representing a request to deactivate the query mode. Step 141 comprises expiry of the timer started in step 131. Step 143 is performed after steps 139 and 141. Step 143 comprises transmitting one or more further commands to the lighting system. The one or more further commands instruct the lighting system to enable control of the set of lighting devices by the subset of light control devices. In the embodiment of FIG. 3, step 109 of FIG. 2 is part of step 143, as the subset of light control device may comprise multiple light control devices. Step 101 is repeated after step 143, after which the method continues as shown in FIG. 3.

Figure 4:
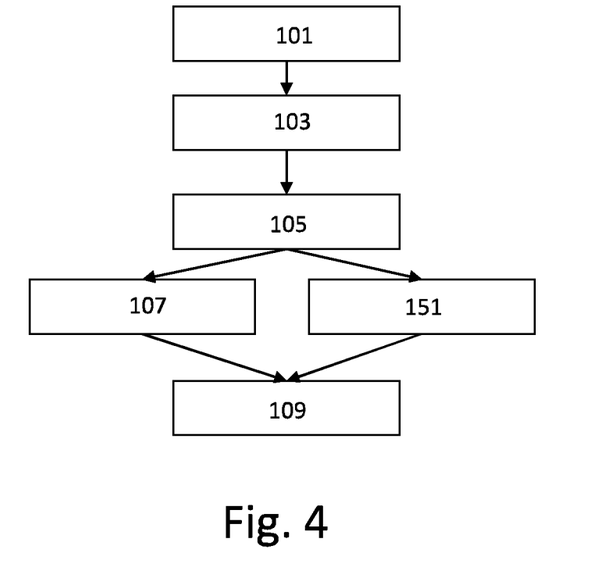
FIG. 4 is a flow diagram of a fourth embodiment of the method.

A third embodiment of the method of controlling a lighting system is shown in FIG. 4. In this third embodiment, compared to the first embodiment of FIG. 2, step 121 has been omitted and a step 151 has been added. In this embodiment, the control information received in step 105 describes the function corresponding to the user interaction. In an alternative embodiment, both steps 121 and 151 are present. Step 151 comprises controlling a further lighting device of the one or more lighting devices based on the received control information. In the embodiment of FIG. 4, step 151 is performed at least partly in parallel with step 107. In an alternative embodiment, step 151 is performed before or after step 107.

With the embodiment of FIG. 4, the function may not only be described using audio and/or video information, but also demonstrated on a nearby "test" light, where the test light could be chosen such that it has minimal impact on the overall light level/ambiance. For example, if a room has five lights, the system could assign one light as "test" light, such that every interaction with a physical control of a light control device will only impact that specific light.

Figure 5:
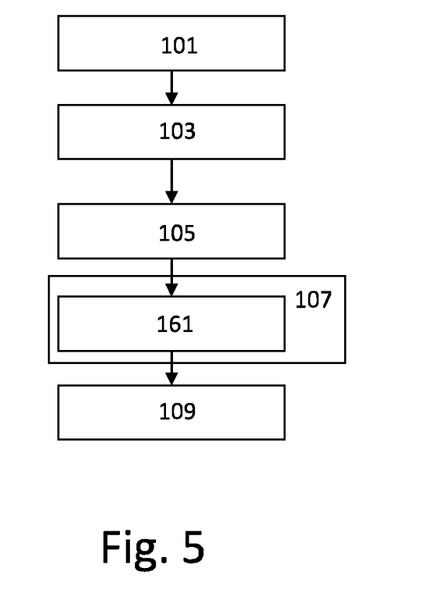
FIG. 5 is a block diagram of an exemplary data processing system for performing the method of the invention.

A fourth embodiment of the method of controlling a lighting system is shown in FIG. 5. In this fourth embodiment, compared to the first embodiment of FIG. 2, step 121 has been omitted and step 107 comprise a sub step 161. In this embodiment, the control information received in step 105 describes the function corresponding to the user interaction. In an alternative embodiment, both steps 121 and 161 are present. Step 161 comprises displaying an animation demonstrating the function. More specifically, step 161 comprises displaying a virtual room comprising a virtual representation of the at least one lighting device and the animation superimposed over the virtual room.

With the embodiment of FIG. 4, a virtual representation of a light or set of lights may be used do display the description of the function. For example, when activating this mode through Alexa on an Echo Show, in addition to explaining the function with generated speech in response to interaction with a light control device, the Echo Show could display a virtual room where the light would behave as being controlled by this light control device. A similar approach can be used with an augmented reality-capable device.

Figure 6:
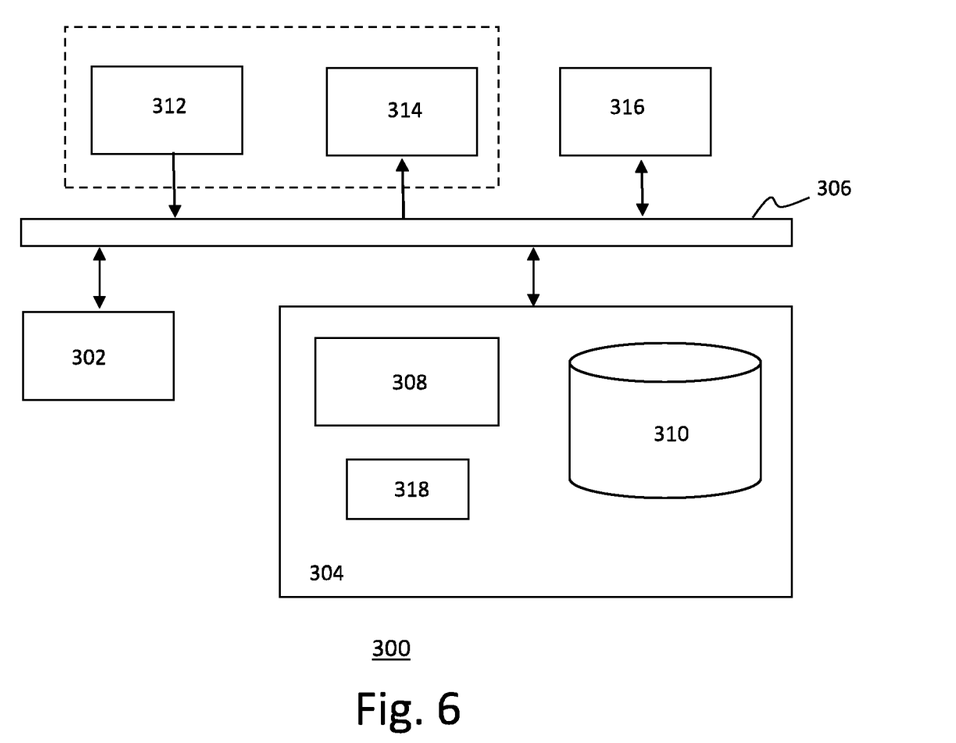
FIG. 6 depicts a block diagram illustrating an exemplary data processing system.

FIG. 6 depicts a block diagram illustrating an exemplary data processing system that may perform the method as described with reference to FIGS. 2 to 5.

As shown in FIG. 6, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 6 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 6, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 6) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 6 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a lighting system, said lighting system comprising a light control device and a lighting device, said light control device being used for controlling said lighting device, said system comprising:
    at least one input interface;
    at least one output interface; and
    at least one processor configured to:
        receive, via said at least one input interface, user input representing a request to activate a query mode in which said user can use the light control device to get information on this light control device, without controlling the lighting device associated with this light control device,
        transmit, via said at least one output interface, a command to said lighting system, said command instructing said lighting system to temporarily disable control of said lighting device by said light control device,
        receive, via said at least one input interface, control information from said lighting system, said control information describing a user interaction with said light control device;
        receive, via said at least one input interface, further control information from said lighting system, said further control information describing a function corresponding to said user interaction,
        render, via said at least one output interface, audio and/or visual information describing said function corresponding to said user interaction to said user, and
        transmit, via said at least one output interface, a further command to said lighting system, said further command instructing said lighting system to enable control of said lighting device by said light control device.

2. A system as claimed in claim 1, wherein said command and said further command are transmitted to said light control device and said control information and said further control information is received from said light control device.

3. A system as claimed in claim 1, wherein said control information comprises an identifier of said light control device and describes a user interaction with said light control device and said at least one processor is configured to determine a description of said function from said identifier and said description of said user interaction.

4. A system as claimed in claim 1, wherein said control information describes a user interaction with a button or rotary switch of said light control device and said further control information describes a function corresponding to said user interaction with said button or rotary switch of said light control device.

5. A system as claimed in claim 1, wherein said at least one processor is configured to render, via a display and/or a speaker of a mobile device and/or a voice assistant, said audio and/or visual information describing said function.

6. A system as claimed in claim 1, wherein said lighting system comprises a plurality of light control devices and said at least one processor is configured to:
    determine a subset of said plurality of light control devices, said subset of light control devices comprising said light control device and being used to control a set of lighting devices, said set of lighting devices comprising said lighting device,
    transmit, via said at least one output interface, one or more commands to said lighting system, said one or more commands instructing said lighting system to temporarily disable control of said set of lighting devices by said subset of light control devices, and
    transmit, via said at least one output interface, one or more further commands to said lighting system, said one or more further commands instructing said lighting system to enable control of said set of lighting devices by said subset of light control devices.

7. A system as claimed in claim 6, wherein said at least one processor is configured to determine said subset of said plurality of light control devices based on said user input.

8. A system as claimed in claim 6, wherein said at least one processor is configured to determine a location of said user and determine said subset of said plurality of light control devices based on said location.

9. A system as claimed in claim 1, wherein said at least one processor is configured to receive, via said at least one input interface, further user input representing a request to deactivate said query mode and transmit, via said at least one output interface, said further command upon receiving said further user input.

10. A system as claimed in claim 1, wherein said at least one processor is configured to start a timer upon receiving said user input and transmit, via said at least one output interface, said further command upon expiry of said timer.

11. A system as claimed in claim 6, wherein said at least one processor is configured to control, via said at least one output interface, a further lighting device of said one or more lighting devices based on said received control information.

12. A system as claimed in claim 1, wherein said at least one processor is configured to display, via said at least one output interface, an animation demonstrating said function.

13. A system as claimed in claim 12, wherein said at least one processor is configured to display, via said at least one output interface, a virtual room comprising a virtual representation of said at least one lighting device and said animation superimposed over said virtual room.

14. A method of controlling a lighting system, said lighting system comprising a light control device and a lighting device, said light control device being used for controlling said lighting device, said method comprising:
- receiving user input representing a request to activate a query mode in which said user can use the light control device to get information on this light control device, without controlling the lighting device associated with this light control device;
- transmitting a command to said lighting system, said command instructing said lighting system to temporarily disable control of said at least one lighting device by said light control device;
- receiving control information from said lighting system, said control information describing a user interaction with said light control device;
- receiving further control information from said lighting system, said further control information describing a function corresponding to said user interaction;
- rendering audio and/or visual information describing said function corresponding to said user interaction to said user; and
- transmitting a further command to said lighting system, said further command instructing said lighting system to enable control of said lighting device by said light control device.

15. A non-transitory computer readable media comprising, at least one software code portion, the at least one software code portion when run on a computer system, causing the computer system to perform the method of claim 14;
- wherein said computer system comprises at least one input interface, at least one output interface, and at least one processor; and wherein the user input representing a request to activate a query mode is received via said at least one input interface, said command to said lighting system is transmitted via said at least one output interface, said control information and said further control information is received from said lighting system via said at least one input interface, said audio and/or visual information is rendered via said at least one output interface; and said further command is transmitted to said lighting system via said at least one output interface.

* * * * *